United States Patent
Peng et al.

(10) Patent No.: US 12,491,509 B2
(45) Date of Patent: Dec. 9, 2025

(54) UNIVERSAL APTAMER-BASED COLLOIDAL GOLD LATERAL FLOW TEST STRIP FOR DETECTING SMALL-MOLECULE SUBSTANCES

(71) Applicant: Jiangnan University, Wuxi (CN)

(72) Inventors: Chifang Peng, Wuxi (CN); Xiuping Li, Wuxi (CN); Guowen Li, Wuxi (CN); Rui Chang, Wuxi (CN); Zhijuan Qian, Wuxi (CN)

(73) Assignee: Jiangnan University, Wuxi (CN)

( * ) Notice: Subject to any disclaimer, the term of this patent is extended or adjusted under 35 U.S.C. 154(b) by 617 days.

(21) Appl. No.: 18/048,699

(22) Filed: Oct. 21, 2022

(65) Prior Publication Data
US 2023/0081589 A1 Mar. 16, 2023

Related U.S. Application Data

(63) Continuation of application No. PCT/CN2021/118498, filed on Sep. 15, 2021.

(30) Foreign Application Priority Data

Jun. 15, 2021 (CN) .......... 202110660432.5

(51) Int. Cl.
*B01L 3/00* (2006.01)
*C12Q 1/6834* (2018.01)

(52) U.S. Cl.
CPC .......... *B01L 3/5023* (2013.01); *C12Q 1/6834* (2013.01); *B01L 2300/0825* (2013.01)

(58) Field of Classification Search
CPC .......... B01L 3/5023; B01L 2300/0825; C12Q 1/6834; G01N 33/5308; G01N 33/54388; G01N 33/587; G01N 33/52; G01N 33/558
See application file for complete search history.

(56) References Cited

U.S. PATENT DOCUMENTS

2017/0089892 A1* 3/2017 Aghvanyan .......... C12Q 1/6832

FOREIGN PATENT DOCUMENTS

CN 106990237 A 7/2017
CN 108008128 A 5/2018
(Continued)

OTHER PUBLICATIONS

CN107478830 translation (Year: 2017).*
(Continued)

*Primary Examiner* — Samuel P Siefke
(74) *Attorney, Agent, or Firm* — IPro, PLLC; Na Xu

(57) ABSTRACT

The present disclosure discloses a universal aptamer-based colloidal gold lateral flow test strip for detecting small-molecule substances and belongs to the fields of analytical chemistry, medicine, environment, food safety detection, nano-biosensing and the like. An AuNPs@poly-DNA probe is used for rapidly and sensitively capturing an aptamer, streptavidin sprayed in a test zone and streptavidin-biotin-DNAc sprayed in a control zone do not need to be changed, and another substance can be detected only by changing a nucleic acid chain part of the AuNPs@poly-DNA probe. A universal colloidal gold lateral flow test strip, which is rapid, sensitive and low in cost, has been developed. The test strip method for detecting small-molecule substances is simple, convenient and rapid, and can be used for detection at any time. Only a test solution is needed to be added into a sample port and the test strip is completely developed after 5 min, thus an experiment result can be observed and the detection efficiency can be greatly improved. Qualitative analysis can be conducted by naked eyes, and quantitative analysis can be conducted by a colloidal gold test strip quantitative analyzer.

11 Claims, 6 Drawing Sheets

Specification includes a Sequence Listing.

(56) References Cited

FOREIGN PATENT DOCUMENTS

| | | |
|---|---|---|
| CN | 108303415 A | 7/2018 |
| CN | 111621598 A | 9/2020 |
| WO | 2004042084 A1 | 5/2004 |

OTHER PUBLICATIONS

CN106290831 translation (Year: 2017).*
CN206479535 translation (Year: 2017).*
CN110646610 (Year: 2020).*

* cited by examiner

UNIVERSAL APTAMER-BASED COLLOIDAL GOLD LATERAL FLOW TEST STRIP FOR DETECTING SMALL-MOLECULE SUBSTANCES

REFERENCE TO SEQUENCE LISTING

The instant application contains a Sequence Listing in XML format as a file named "3050-YGHY-2022-25-SE-Q.xml", created on Oct. 13, 2022, of 13 kB in size, and which is hereby incorporated by reference in its entirety.

TECHNICAL FIELD

The present disclosure relates to a universal aptamer-based colloidal gold lateral flow test strip for detecting small-molecule substances and belongs to the fields of analytical chemistry, medicine, environment, food safety detection, nano-biosensing and the like.

BACKGROUND

Lateral flow assay is a paper-based detection platform and can be used for detecting a variety of target substances, and has caused great interest to researchers due to its potential to provide results within a few minutes. Since the lateral flow assay has low cost and is easy for development and production, it has been extensively used for on-site testing and widely applied to a wide variety of fields including biomedicine, food safety, quality control and environmental health. The lateral flow assay may be applied to a range of biological samples including urine, saliva, sweat, serum, plasma and blood. Therefore, the lateral flow assay has higher application value in various fields.

The lateral flow assay has two modes: a competitive type and a sandwich type. The competitive type is commonly used for detecting low molecular weight compounds (e.g., mycotoxins, etc.). In a preparation process of a competitive colloidal gold test strip, an artificial antigen specifically bound to a target and a species-specific anti-immunoglobulin antibody are usually sprayed on a nitrocellulose (NC) membrane to be used as a test line (T line) and a quality control line (C line) respectively, or an aptamer complementary chain aiming at the target and an artificially designed nucleic acid chain can be sprayed on the nitrocellulose (NC) membrane as the test line (T line) and the quality control line (C line) respectively. The signal intensity of the T line is inversely proportional to the concentration of a test target in a sample to be tested. The C line has an independent visible signal whether the sample to be tested contains the test target or not. In recent years, more and more researchers have focused on detecting small-molecule substances by the lateral flow assay.

An aptamer is a small segment of structured oligonucleotide sequence (RNA or DNA) obtained by an in vitro screening technology-systematic evolution of ligands by exponential enrichment (SELEX), can be combined with corresponding target molecules (proteins, viruses, bacteria, cells, heavy metal ions and the like) with high affinity and strong specificity, and provides a new research platform for efficient and rapid identification for chemical, biological and biomedical communities.

The aptamer-labeled colloidal gold lateral flow test strip has advantages of long-term stability, short detection time, low cost, simple operation, rapidness and the like, and is an ideal method for rapidly detecting various targets on site. In the design of the existing aptamer-based colloidal gold lateral flow test strip, a nucleic acid chain-streptavidin compound is usually sprayed on the T line. But when test targets change, a specific compound needs to be prepared again and sprayed on the NC membrane, such that the existing lateral flow test strip has poor universality.

At present, there are few studies on colloidal gold lateral flow test strip for recognizing small-molecule compounds based on aptamers. In the literature (Biosensors & Bioelectronics, 2015,71(15): 230-242), DNA-functionalized gold nanospheres (AuNPs-DNA) are used as a probe; magnetic microspheres (MMS) are used for quickly separating a complementary chain (cDNA) of a kanamycin aptamer; the cDNA is used as a test target and applied on a test strip; and the detection concentration of the cDNA is converted into that of kanamycin, such that the kanamycin is qualitatively and quantitatively detected with a limit of detection of 4.96 nmol/L (S/N=3). The test strip needs to be aided by the MMS and the detection of the kanamycin is converted into the detection of the cDNA, which is relatively complicated and not conducive to stable production of the product and repeatability of the application. In the literature (Journal of Chromatography B, 2016, 1022: 102-108), an aptamer-based lateral flow test strip is developed, which uses a competitive binding mode for on-site rapid detection of ochratoxin A (OTA) in Astragalus membranaceus. A competition reaction occurs between a DNA probe (test zone) immobilized on the test strip and a target (OTA) in the sample, and the two substances compete for binding to an AuNPs-apt conjugate. The color strength of the T line of the test strip is negatively correlated with the concentration of the OTA in the sample. The method can detect the OTA within 15 min and has a limit of detection of 1 ng/mL. The test strip conjugates the aptamer to AuNPs, which is not conducive to competition of the OTA for the aptamer in the sample, thus the product has poor stability and the design is complex and has poor universality.

The key to developing the aptamer-based colloidal gold lateral flow test strip with high sensitivity and specificity is to design a complementary DNA chain of the aptamer. An ideal complementary DNA chain of the aptamer must ensure that the dissociation constant is within a certain range. When the binding force of the designed complementary DNA chain is low, the binding of the aptamer to the complementary DNA chain may lead to weak hybridization. Thus even in the absence of the target, a weaker test line may also appear. In contrast, the complementary DNA chain with excessive high target binding force may still produce a stronger test line in the presence of the target.

At present, the developed aptamer-based colloidal gold lateral flow test strip is for a specific target, the probe on the test strip needs to be repeatedly optimized and designed, the universality is poor, and the detection sensitivity needs to be improved.

SUMMARY

Technical Problem

In the prior art, the aptamer-based colloidal gold lateral flow test strip is usually designed by spraying a gold label aptamer on a gold label pad and spraying a streptavidin-nucleic acid chain compound or an aptamer with a fluorescent label or a complementary chain of an aptamer on a test line (T line). But aiming at a specific test target, a streptavidin-nucleic acid chain compound needs to be prepared again and sprayed on a nitrocellulose membrane, such that the existing lateral flow test strip has poor universality, low detection sensitivity and high preparation cost.

Technical Solution

The present disclosure uses a polyA-DNA as a probe. The probe uses polyA as an anchor block and the polyA-DNA is anchored to gold nanoparticles to prepare an AuNPs@polyA-DNA conjugate. Streptavidin is sprayed on a test zone (T line) of a nucleic acid test strip and an oligonucleic acid chain (DNAc) complementary to the polyA-DNA part of the AuNPs@polyA-DNA conjugate is sprayed on a control zone (C line) to prepare a universal test strip. The streptavidin sprayed on the T line and a streptavidin-biotin-oligonucleic acid chain compound sprayed on the C line do not need to be changed, and another substance can be detected only by changing a part of the poly-DNA complementary to the aptamer, which provides convenience for later detection.

The aptamer used in the present disclosure is obtained by adding 5 T bases to a base sequence of the reported aptamer and the 5 nucleic acid bases are used to assist hybridization. There are 15 bases on the probe being complementary to the aptamer. After a biotinylated aptamer is bound to the AuNPs@polyA-DNA conjugate anchored with the probe, the probe can further bind to the streptavidin on the T line. When there is a small-molecule substance, the small-molecule substance competes with the probe to bind the aptamer, which inhibits the hybridization of the probe and the aptamer, thus inhibiting the color development of the T line and realizing rapid detection.

The universality of the aptamer-based colloidal gold lateral flow test strip provided by the present disclosure lies in preparation of a nitrocellulose membrane and design of the probe, that is, when the colloidal gold test strip for different small-molecule substances is prepared, the T line and C line on the nitrocellulose membrane do not need to be changed, only the corresponding aptamer of the small-molecule substances and the AuNPs@polyA-DNA conjugate on the gold label pad are needed to be changed, that is, the aptamer and the probe polyA-DNA are changed correspondingly for different small-molecule substances.

The present disclosure provides an aptamer and AuNPs@polyA-DNA conjugate-based universal colloidal gold lateral flow test strip for detecting kanamycin. The test strip is generally composed of a sample pad, a conjugate pad (gold label pad), a nitrocellulose (NC) membrane, an absorbent pad and a PVC adhesive plate.

A detection principle of the test strip is as follows: a competitive method is adopted to detect small-molecule substances. When a sample solution to be tested does not contain the small-molecule substances, an aptamer with a biotinylated 5' end is bound with an AuNPs@polyA-DNA conjugate, and then is captured by streptavidin on a T line to form an AuNPs@polyA-DNA-Apt compound. Due to accumulation of AuNPs, a clear dark red band can be observed on the T line and a test result is negative. When the sample solution to be tested contains the small-molecule substances, the small-molecule substances bind to the aptamer with a biotinylated 5' end, the aptamer cannot bind to the AuNPs@polyA-DNA probe, thus the accumulation of the probe on the T line is reduced, the color of the T line is lighter or not developed, and a test result is positive. The color strength of the T line of the test strip is negatively correlated with the concentration of the small-molecule substances. Whether the sample solution contains the small-molecule substances or not, the AuNPs@polyA-DNA conjugate can be captured by DNAc in the C line to develop color.

The first purpose of the present disclosure is to provide a universal colloidal gold lateral flow test strip, and the test strip contains an aptamer, a probe polyA-DNA and streptavidin-biotin-DNAc.

In one embodiment, a 5' end of the aptamer is labeled with a biotin; and the aptamer can specifically bind to small-molecule substances to be tested.

In one embodiment, a 3' end of the aptamer is extended by 5-10 T bases.

In one embodiment, the probe polyA-DNA contains a fragment A, a fragment B and a fragment C.

In one embodiment, the fragment A is AAAAAAAAAAAAAAAATTAT.

In one embodiment, the fragment C is 10-15 bases complementary to the extended aptamer from the 3' end.

In one embodiment, the fragment C is 10 or 15 bases complementary to the aptamer from the 3' end.

In one embodiment, the streptavidin-biotin-DNAc is obtained by mixing streptavidin and a DNAc with a 5' end labeled by biotin in an equal volume and conducting incubation at 3-5° C. for 0.8-1.2 h.

In one embodiment, the DNAc has a nucleotide sequence as shown in SEQ ID NO: 5.

In one embodiment, the concentration of the streptavidin is 2.5 mg/mL, and the concentration of the DNAc is 250 μM.

In one embodiment, the small-molecule substances include but are not limited to kanamycin, ochratoxin A (OTA), aflatoxin, streptomycin, chloramphenicol, estradiol, bisphenol A and acetamiprid.

In one embodiment, the aptamer is an oligonucleotide sequence obtained by an in vitro screening technology-systematic evolution of ligands by exponential enrichment and designed for a target to be detected.

In one embodiment, the test strip includes a sample pad, a conjugate pad (gold label pad), a nitrocellulose (NC) membrane, an absorbent pad and a PVC adhesive plate. The sample pad, the gold label pad, the NC membrane and the absorbent pad are pasted on the PVC plate in sequence. A test zone and a control zone are arranged on the NC membrane in sequence and a distance between the test zone and the control zone is 4-6 mm. The streptavidin is on the test zone and the streptavidin-biotin-DNAc is on the control zone. The gold label pad contains an AuNPs@polyA-DNA conjugate.

In one embodiment, the length of an overlapping portion between the sample pad and the gold label pad is 1-2 mm, and the sample pad is placed above the gold label pad; the length of an overlapping portion between the gold label pad and the NC membrane is 1-2 mm, and the gold label pad is placed above the NC membrane; and the length of an overlapping portion between the NC membrane and the absorbent pad is 1-3 mm, and the absorbent pad is placed above the NC membrane.

In one embodiment, the AuNPs@polyA-DNA conjugate is obtained by anchoring the probe polyA-DNA on gold nanoparticles.

In one embodiment, the particle size of the gold nanoparticles is 13-17 nm, and the concentration of the polyA-DNA is 80-120 μM.

The second purpose of the present disclosure is to provide a method for rapidly detecting small-molecule substances. In the method, the foregoing colloidal gold lateral flow test strip is used for testing. A solution to be tested is mixed with the small-molecule substance aptamer, an obtained mixture is incubated, 50-100 μL of the mixture is pipetted onto a sample pad to be incubated for 3-5 min, and qualitative analysis is conducted by naked eyes or quantitative analysis is conducted by a colloidal gold test strip quantitative analyzer according to a standard curve.

In one embodiment, a method for preparing the standard curve is as follows: after a standard solution of a small-molecule substance is diluted to different concentrations, diluents with different concentrations are mixed with an aptamer with a 5' end labeled with biotin, an obtained mixture is dropwise added to the sample pad and incubated for 3-5 min, the quantitative analysis is conducted by the colloidal gold test strip quantitative analyzer, and data is fitted to obtain the standard curve.

In one embodiment, the mixing and incubation are conducted for 15-25 min.

In one embodiment, the volume ratio of the aptamer to the solution to be tested is 1:99.

In one embodiment, the initial concentration of the aptamer is 0.1-1.0 μM.

The third purpose of the present disclosure is to provide a preparation method of the universal colloidal gold lateral flow test strip. The method includes the following specific steps:
(1) Cutting the sample pad and the gold label pad, soaking the pads with PBS and drying.
(2) Spraying the probe AuNPs@polyA-DNA on the gold label pad and drying.
(3) Spraying the streptavidin in the test zone of the NC membrane, spraying the streptavidin-biotin-DNAc in the control zone, fixing the distance between the test zone and the control zone at 5 mm, and drying at 35-39° C. for 2 h.
(4) Pasting the sample pad, the gold label pad, the NC membrane and the absorbent pad prepared in steps (1)-(3) on the PVC plate in sequence to obtain the colloidal gold lateral flow test strip for detecting kanamycin.

In one embodiment, the AuNPs@polyA-DNA conjugate is obtained by using the probe polyA-DNA as an anchor block and anchoring the polyA-DNA on the gold nanoparticles; and the probe polyA-DNA contains a polyA fragment, a fragment complementary to the DNAc and a fragment complementary to the aptamer of the small-molecule substances.

In one embodiment, the polyA fragment is AAAAAAAAAAAAAAAATTAT.

In one embodiment, a 3' end of the aptamer is extended by 5-10 T bases.

In one embodiment, the 3' end of the aptamer is extended by 5 or 10 T bases.

In one embodiment, the fragment complementary to the aptamer of the small-molecule substances is 10-15 bases complementary to the extended aptamer from the 3' end.

In one embodiment, a 5' end of the aptamer is labeled with a biotin; and the aptamer can specifically bind to small-molecule substances to be tested.

In one embodiment, the particle size of the gold nanoparticles is 13-17 nm.

In one embodiment, the concentration of the polyA-DNA is 80-120 μM.

In one embodiment, the DNAc has a nucleotide sequence as shown in SEQ ID NO: 5.

In one embodiment, the length of an overlapping portion between the sample pad and the gold label pad is 1-2 mm, and the sample pad is placed above the gold label pad; the length of an overlapping portion between the gold label pad and the NC membrane is 1-2 mm, and the gold label pad is placed above the NC membrane; and the length of an overlapping portion between the NC membrane and the absorbent pad is 1-3 mm, and the absorbent pad is placed above the NC membrane.

The present disclosure further provides use of the universal colloidal gold lateral flow test strip or the preparation method of the universal colloidal gold lateral flow test strip in the fields of pesticide residues, veterinary drug residues, environmental monitoring, food safety monitoring and biomedicine.

Beneficial Effects Of The Present Disclosure (1) The present disclosure prepares an aptamer-based universal colloidal gold lateral flow test strip with high sensitivity and high specificity. The test strip is sensitive to detect kanamycin and OTA (a limit of detection of the naked eyes is 15 ng/mL and 10 ng/mL respectively, and a limit of detection of the reader is 0.3 ng/mL and 0.18 ng/mL respectively) and rapid for detection (20 min), and has highly reproducible test results.

(2) The method provided by the present disclosure realizes high-sensitivity colorimetric detection of small-molecule substances (such as kanamycin and OTA in the present disclosure). In a concentration range of 5-250 ng/mL, T/C lines show a good linear relationship with the concentration of the kanamycin with a limit of detection of 0.3 ng/mL. In a concentration range of 1-250 ng/mL, T/C lines show a good linear relationship with the concentration of the kanamycin with a limit of detection of 0.18 ng/mL.

(3) According to the test strip constructed in the present disclosure, the streptavidin and the nucleic acid chain sprayed in the test zone and the control zone do not need to be changed, another substance can be detected only by changing a colloidal gold-nucleic acid conjugate, therefore the universality of a nitrocellulose membrane prepared by spraying is improved, the preparation process is simplified and the cost of the test strip is reduced.

(4) A color change of the test zone of the test strip can be observed, thus qualitative detection of the small-molecule substances can be realized by the naked eyes and quantitative analysis can be realized by using a colloidal gold quantitative analyzer.

(5) In the design of the aptamer of the test strip, 5-10 T bases are added to a 3' end of the known aptamer, the number of complementary bases of the probe polyA-DNA and the aptamer is further reduced, and the response of the test strip to the small-molecule substances in the sample to be tested is improved; at the same time, the binding efficiency of the aptamer and the probe can also be increased; the sensitivity is improved; and the amount of the aptamer and the cost are reduced.

BRIEF DESCRIPTION OF FIGURES

Results are shown in FIG. 8A. When the nucleic acid probe chains were polyA-DNA$_{(10+5)}$ with the nucleic acid sequence as shown in SEQ ID NO: 2 and polyA-DNA$_{(15+10)}$ as shown in SEQ ID NO: 10, the relative signal intensity (T/C) was significantly enhanced compared with the nucleic acid probe chains polyA-DNA$_{(20)}$ and polyA-DNA$_{(15)}$ with no T base added at a 3' end. Therefore, the probe chains of polyA-DNA$_{(5+10)}$ and polyA-DNA$_{(10+5)}$ were used for detecting kanamycin to test the sensitivity of the detection. When the concentration of the aptamer was 0.5 μM, the probe chains of polyA-DNA$_{(5+10)}$ and polyA-DNA$_{(10+5)}$ were used to detect the kanamycin. As shown in FIG. 8B, when kanamycin of the same concentration (150 ng/mL) was added and the nucleic acid probe chain polyA-DNA$_{(10+5)}$ with the nucleotide sequence as shown in SEQ ID NO: 2 was used, the change of the corresponding signal intensity of the kanamycin (ΔT/C value) was the largest. Therefore, the probe used in the following examples was polyA-DNA$_{(10+5)}$ with the nucleotide sequence as shown in SEQ ID NO: 2.

TABLE 1

Nucleic acid sequences of universal aptamer-based lateral flow strip (LFS) for canamycin

| No. | Name of DNA | Sequence (5'-3') | |
|---|---|---|---|
| 1 | Aptamer$_{(20 + 0)}$ | T*GGGGGTTGAGGCTAAGCCGA* | SEQ ID NO: 6 |
|  | poly A-DNA$_{(20 + 0)}$ | AAAAAAAAAAAAAAATTATATTATTATTATAGAGTG*TCGGCTTA GCCTCAACCCCC* | SEQ ID NO: 7 |
| 2 | Aptamer$_{(15 + 0)}$ | TGGGG*GTTGAGGCTAAGCCGA* | SEQ ID NO: 8 |
|  | poly A-DNA$_{(15 + 0)}$ | AAAAAAAAAAAAAAATTATATTATTATTATAGAGTG*TCGGCTTA GCCTCAA* | SEQ ID NO: 9 |
| 3 | Aptamer$_{(5 + 10)}$ | TGGGGGTTGAGGCTAGCCGATTTTTTTTTT | SEQ ID NO: 10 |
|  | poly A-DNA$_{(5 + 10)}$ | AAAAAAAAAAAAAAATTATATTATTATTATAGAGTGAAAAAAAA AATCGGC | SEQ ID NO: 11 |
| 4 | Aptamer$_{(5 + 5)}$ | TGGGGGTTGAGGCTAGCCGATTTTT | SEQ ID NO: 12 |
|  | poly A-DNA$_{(5 + 5)}$ | AAAAAAAAAAAAAAATTATATTATTATTATAGAGTGAAAAATCG GC | SEQ ID NO: 13 |
| 5 | Aptamer$_{(10 + 5)}$ | TGGGGGTTGAG*GCTAAGCC*GATTTTT | SEQ ID NO: 1 |
|  | poly A-DNA$_{(10 + 5)}$ | AAAAAAAAAAAAAAATTATATTATTATTATAGAGTGAAAAATCG GCTTAGC* | SEQ ID NO: 2 |
|  | DNA$_C$ | AAAAACACTCTATAATAATAAT | SEQ ID NO: 5 |

DETAILED DESCRIPTION

Example 1: Preparation of Aptamer-Based Test Strip For Rapidly Detecting Kanamycin The specific steps are as follows:

1. Design of Aptamer Sequences and Probes

To ensure that an aptamer with a biotinylated 5' end can bind to AuNPs@polyA-DNA and be captured by streptavidin (SA) in a T line zone, nucleic acid probe chains with different sequences (polyA-DNA$_{(20)}$, polyA-DNA$_{(15)}$, polyA-DNA$_{(5+10)}$, polyA-DNA$_{(5+5)}$ and polyA-DNA$_{(10\ +5)}$) were selected to be conjugated with AuNPs (as shown in Table 1) and the concentration of the aptamer was 0.5 μM.

(Sequences underlined or in bold represent complementary sequences; sequences in bold italics represent aptamer partial sequences or complementary sequences thereof; and sequences in bold represent aptamer extended sequences or complementary sequences thereof.)

Figure 9:
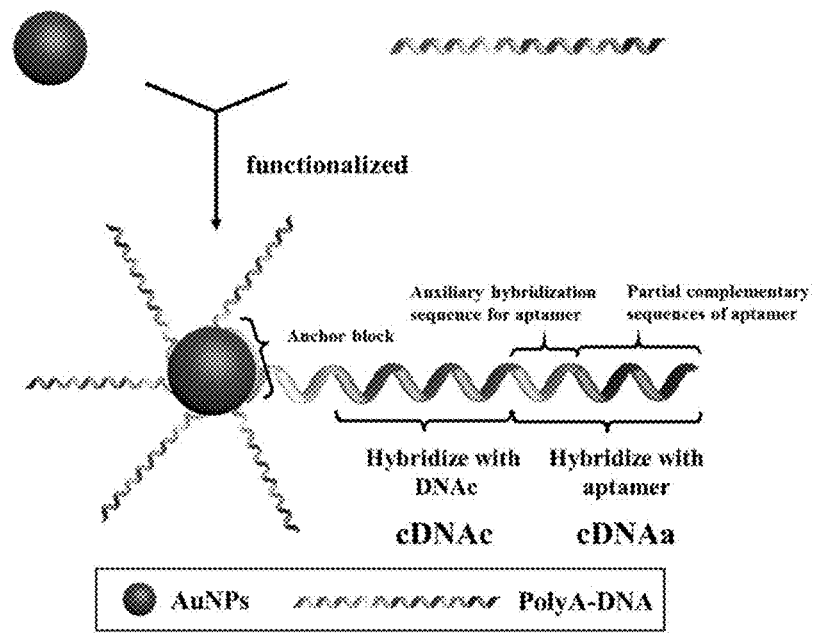
FIG. 9 is a structure of polyA-DNA.

Design of polyA-DNA: polyA-DNA had three functional regions. A first functional region was polyA which acted as an anchor block to anchor polyA-DNA on gold nanoparticles; a second functional region was a region complementary to a DNAc; and a third functional region was a region complementary to an aptamer (FIG. 9).

Design of oligonucleotide DNAc: as shown in Table 1 and Table 2, the underlined position of the DNAc sequence was complementary to the polyA-DNA and 5 A bases were connected to a 3' end of the DNAc.

TABLE 2

DNA sequences of test strip for rapidly detecting kanamycin

| Nucleic acid | Sequence (5'-3') | |
|---|---|---|
| Kanamycin aptamer Aptamer(10 + 5) | TGGGGGTTGAGGCTAAGCCGA*TTTTT* | SEQ ID NO: 1 |
| Kanamycin colloidal gold labeled nucleic acid probe polyA-DNA (10 + 5) | AAAAAAAAAAAATTATATTATTATTATAGAGTG*AAAAAATCGGCTT* AGC | SEQ ID NO: 2 |
| DNAc | AAAAACACTCTATAATAATAAT | SEQ ID NO: 5 |

(Sequences underlined or in bold represent complementary sequences; sequences in bold represent aptamer partial sequences or complementary sequences thereof; and sequences in bold italics represent aptamer extended sequences or complementary sequences thereof.)

TABLE 3

DNA sequences of test strip for rapidly detecting OTA

| Nucleic acid | Sequence (5'-3') | |
|---|---|---|
| OTA aptamer Aptamer (10 + 5) | GATCGGGTGTGGGTGGCGTAAAGGGAGCATCGGACA*TTTTT* | SEQ ID NO: 3 |
| OTA colloidal gold labeled nucleic acid probe polyA-DNA (10 + 5) | AAAAAAAAAAAAAATTATATTATTATTATAGAGTG*AAAAATGTCC* GATGC | SEQ ID NO: 4 |
| DNAc | AAAAACACTCTATAATAATAAT | SEQ ID NO: 5 |

(Sequences underlined or in bold represent complementary sequences; sequences in bold represent aptamer partial sequences or complementary sequences thereof; and sequences in bold italics represent aptamer extended sequences or complementary sequences thereof.)

2. Preparation and Functionalization of Gold Nanoparticles (AuNPs)

(1) Preparation of AuNPs

Glassware used for synthesis and storage of nanomaterials in the experiment was soaked in aqua regia (hydrochloric acid:nitric acid=3:1) for 12 h and washed with ultrapure water for later use.

The AuNPs were prepared by a sodium citrate reduction method. The specific steps were as follows:

1) 100 mL of 0.01% $HAuCl_4$ was added to a 250-mL conical flask, heating and stirring were carried out until the solution was boiling, and maintained for 1-2 min.
2) 2 mL of a 1% trisodium citrate solution was rapidly added to the conical flask, and heating and stirring were continued. The color of the mixed solution gradually changed from light yellow to dark purple and finally to wine red. Heating was kept for 10 min to prepare the AuNPs with the particle size of 15 nm. The AuNPs were cooled to room temperature and refrigerated at 4° C. for later use.

(2) Functionalization of AuNPs 1) 5-15 μL of 100 μM polyA-DNA was added to 1 mL of the AuNPs (10 nM) prepared in step (1) to be mixed evenly, and 20 μL of 500 mM citrate buffer (pH 3.0) was added. After mixed evenly, a mixture was incubated at room temperature for 3 min.
2) After incubation, 60 μL of 500 mM HEPES buffer at pH 7.6 was added to adjust the pH of the AuNPs solution to be neutral, and a mixture was incubated at room temperature for 5-10 min.
3) After incubation, centrifugation was conducted at 10000 r/min for 20 min. A supernatant was removed. A resuspension solution was added to precipitates for redissolving. Repeat centrifugation was conducted at 10000 r/min for 20 min for three times to remove unreacted nucleic acid. 400 μL of the resuspension solution was added to obtain the functionalized AuNPs, namely the probe AuNPs@polyA-DNA which was refrigerated at 4° C. for later use.

Figure 2A:
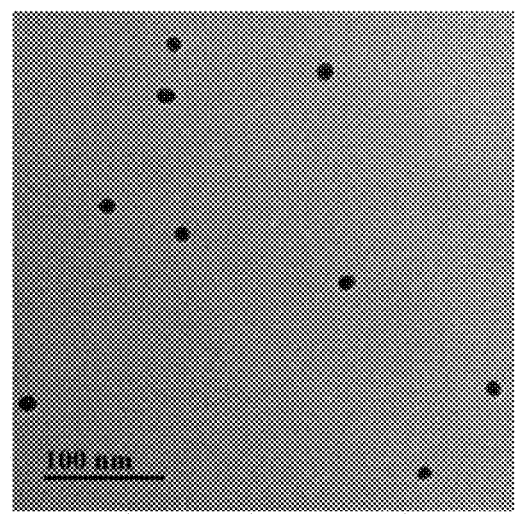
FIG. 2A a transmission electron microscopy (TEM) image of AuNPs; and (b) absorption spectrum of the AuNPs.
Figure 2B:
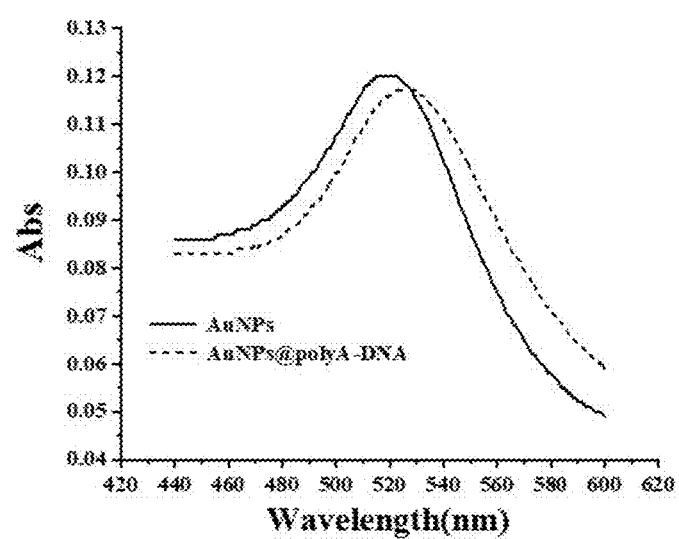
FIG. 2B absorption spectrum of the AuNPs.

The AuNPs prepared in step (1) and the AuNPs@polyA-DNA prepared in step (2) were characterized by transmission electron microscopy respectively. Results are shown in FIG. 2. The prepared AuNPs with the particle size of 15 nm have a single characteristic absorption peak at 520 nm. When the AuNPs bind to the polyA-DNA, the maximum absorption wavelength is shifted to 530 nm, which preliminarily proves that the polyA-DNA successfully modifies the AuNPs.

The resuspension solution consists of 20 mM of $Na_3PO_4$, 5% of BSA, 10% of sucrose and 0.25% of Tween-20.

3. Preparation of Streptavidin-Biotin-DNAc (1) 100 μL of 2.5 mg/mL streptavidin was mixed with 100 μL of 250 μM DNAc with a 5'-end labeled with biotin, and incubation was conducted at 4° C. for 1 h to obtain a mixed solution.
(2) The mixed solution was treated by an ultrafiltration tube (MWCO 30 kDa). Centrifugation was conducted at 6000 r/min for 20 min for three times. Precipitates were resuspended in 300 μL of 10 mM PBS to obtain streptavidin-biotin-DNAc which was stored at 4° C. for later use.

4. Assembly of Aptamer Test Strip (1) A sample pad and a conjugate pad (gold label pad) were cut into appropriate sizes. The pads were soaked with 10 mM PBS for 30 min and then were dried at 45° C.
(2) The probe AuNPs@polyA-DNA obtained in step 1 was evenly sprayed on the conjugate pad and the pad was dried at 37° C. for 2 h.

(3) The streptavidin and the streptavidin-biotin-DNAc prepared in step 2 were sprayed on an NC membrane at the speed of 0.9 μL/cm by a three-dimensional spraying instrument to serve as a test zone (T line) and a control zone (C line) respectively. The distance between the test zone and the control zone was fixed at 5 mm. Drying was conducted at 37° C. for 2 h.

Figure 1:
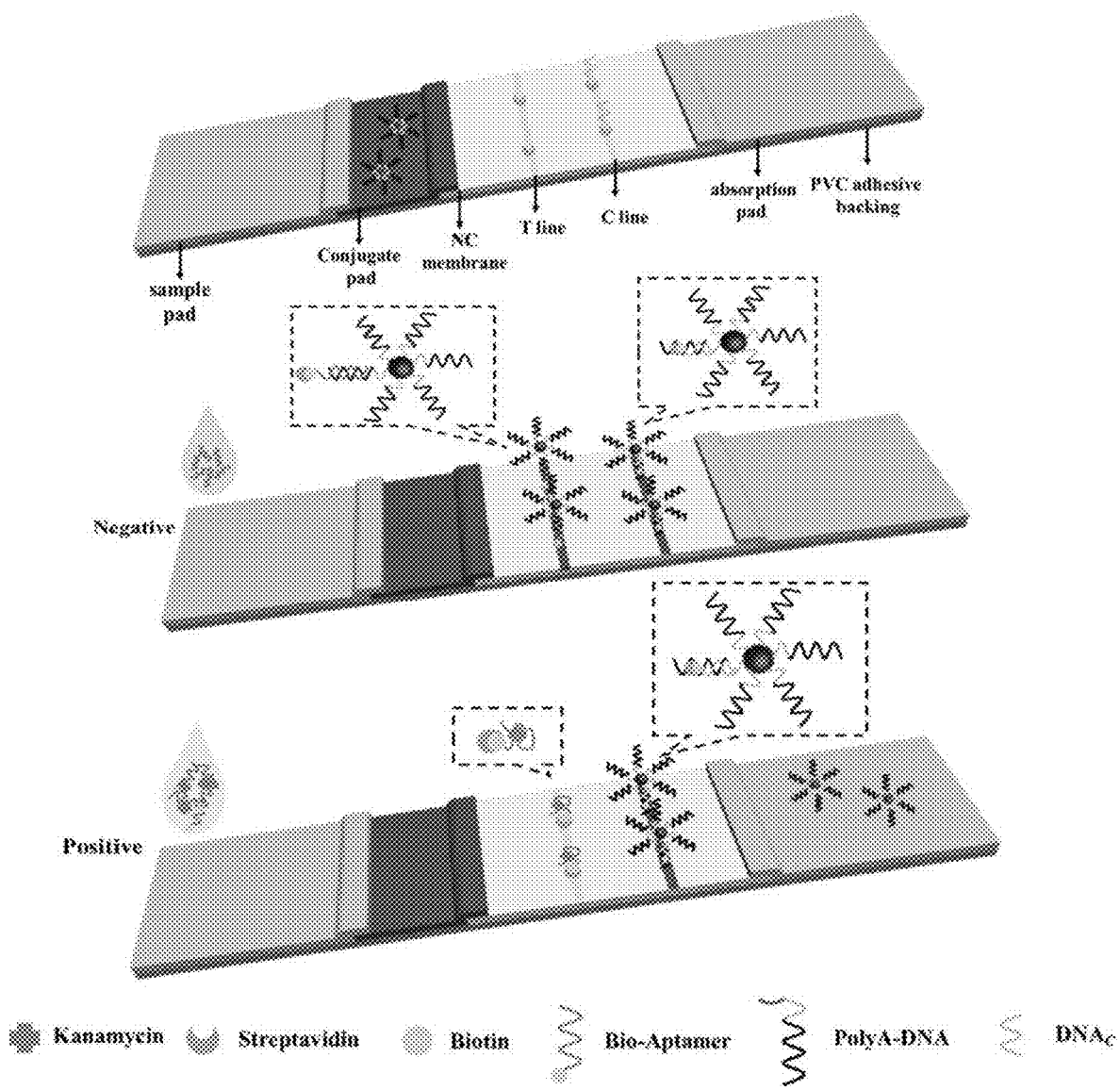
FIG. 1 is a schematic structural diagram and detection schematic diagram of a test strip.

(4) The sample pad, the conjugate pad, the NC membrane and an absorbent pad prepared in steps (1)-(3) were pasted on a PVC plate in sequence according to FIG. 1. The assembled test strip was evenly cut into the width of 4 mm, and the cut test strip was put into a packaging bag for sealed storage.

Example 2: Determination of Kanamycin Standard Solution With Test Strip (1) Preparation of Kanamycin Standard Solution A kanamycin standard solution was diluted with Running buffer (4×SSC, pH 7) to final concentrations of 0.5, 5, 15, 25, 50, 150, 250 and 400 ng/mL respectively. A kanamycin aptamer with the nucleotide sequence as shown in SEQ ID NO: 1 was diluted to 0.5 μM with ultrapure water.

(2) Establishment of Standard Curve For Detection by Kanamycin Nucleic Acid Test Strip:

99 μL of the kanamycin standard solutions with different concentrations in step (1) were mixed with 1 μL of the kanamycin aptamer solution. The mixture was incubated for 20 min. After mixing and reacting, the mixture was dropwise added to the sample pad for detection. After reaction for 3 min, the relative signal intensity (T/C) was determined, and a standard curve of a corresponding relationship between the relative signal intensity (T/C) and different concentrations of kanamycin was established.

Figure 3:
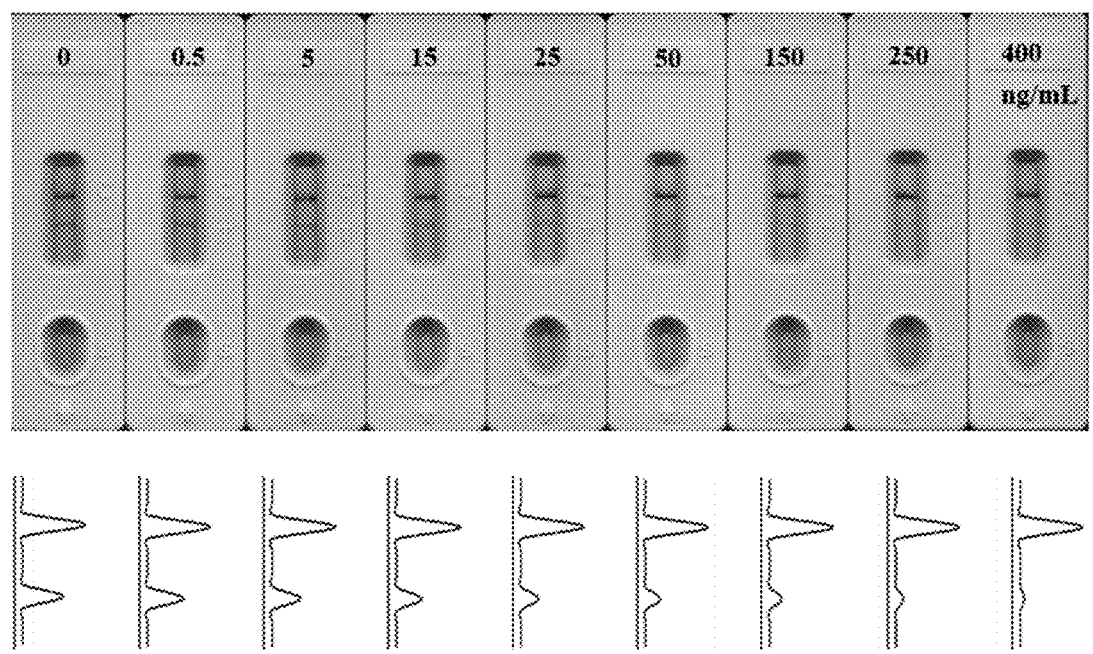
FIG. 3 shows detection graphs of kanamycin standard solutions with different concentrations using the test strip, where the concentrations from left to right are 0, 0.5, 5, 15, 25, 50, 150, 250 and 400 ng/mL respectively.

Results are shown in FIG. 3. When the concentration of kanamycin is 15 ng/mL, the color of the T line on the test strip shows a significant difference when compared with that of the solution containing no kanamycin (0 ng/mL of kanamycin). When the concentration of kanamycin is 5-250 ng/mL, the color of the T line decreases with the increase of the concentration of kanamycin. When the concentration of kanamycin is 250 ng/mL, there is basically no change in the color of the T line. Therefore, a lower limit of detection by the naked eyes is 15 ng/mL and an upper limit of detection is 250 ng/mL.

Figure 4:
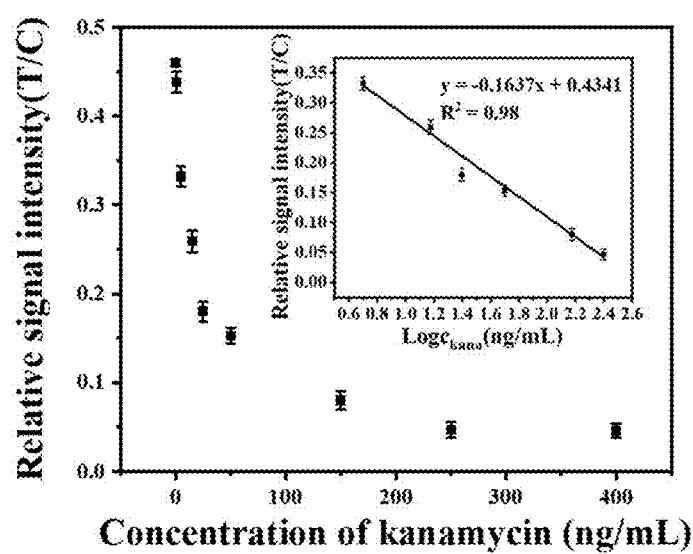
FIG. 4 is a standard curve of relative signal intensity of a T line to a C line (T/C) in the standard detection solutions at different concentrations of kanamycin, where the concentrations from left to right are 0, 1, 10, 50, 100, 250 and 500 ng/mL respectively.

The relative signal intensity (T/C) of kanamycin with different concentrations was read by a colloidal gold test strip quantitative analyzer and a relationship curve between the relative signal intensity (T/C) and the concentration of kanamycin was obtained as shown in FIG. 4 with a lowest limit of detection of 0.3 ng/mL. In the concentration range of 5-250 ng/mL, there is a linear relationship between the relative signal intensity (T/C) and the concentration. A linear regression equation is $y=-0.1637x+0.4341$, $R^2=0.9819$, where y is the relative signal Intensity (T/C) and x is a Log function of the concentration of kanamycin (ng/mL).

Example 3: Determination of Ochratoxin A (OTA) Standard Solution With Test Strip (1) Preparation of OTA Standard Solution An OTA standard solution was diluted with Running buffer (4×SSC, pH 7) to final concentrations of 1, 10, 50, 100, 250 and 500 ng/mL respectively. An OTA aptamer with the nucleotide sequence as shown in SEQ ID NO: 1 was diluted to 0.5 μM with ultrapure water.

(2) Establishment of Standard Curve For Detection by OTA Nucleic Acid Test Strip:

99 μL of the OTA standard solutions with different concentrations in step (1) were mixed with 1 μL of the OTA aptamer solution. The mixture was incubated for 20 min. After mixing and reacting, the mixture was dropwise added to the sample pad for detection. After reaction for 3 min, the relative signal intensity (T/C) was determined, and a standard curve of a corresponding relationship between the relative signal intensity (T/C) and different concentrations of OTA was established.

Figure 5:
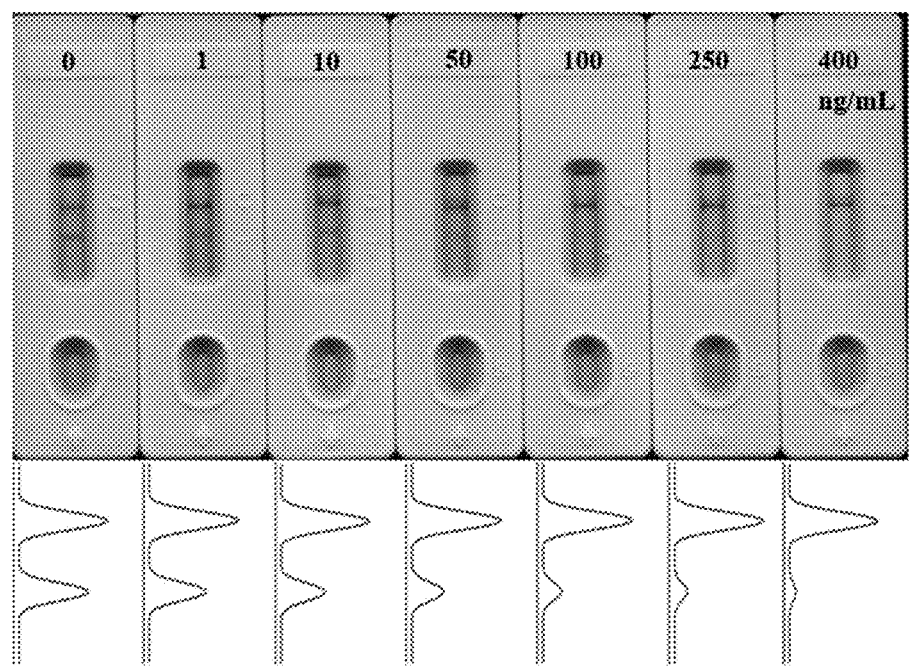
FIG. 5 shows detection graphs of ochratoxin A (OTA) standard solutions with different concentrations using the test strip.

Results are shown in FIG. 5. When the concentration of OTA is 10 ng/mL, the color of the T line on the test strip shows a significant difference when compared with that of the solution containing no OTA (0 ng/mL of OTA). When the concentration of OTA is 1-250 ng/mL, the color of the T line decreases with the increase of the concentration of OTA. When the concentration of OTA is 250 ng/mL, there is basically no change in the color of the T line. Therefore, a lower limit of detection by the naked eyes is 10 ng/mL and an upper limit of detection is 250 ng/mL.

Figure 6:
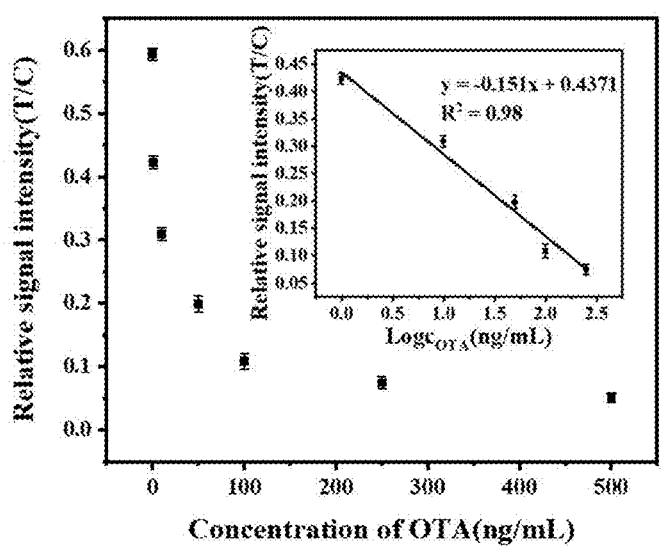
FIG. 6 is a standard curve of relative signal intensity of a T line to a C line (T/C) in the standard detection solutions at different concentrations of OTA.

The relative signal intensity (T/C) of OTA with different concentrations was read by a colloidal gold test strip quantitative analyzer and a relationship curve between the relative signal intensity (T/C) and the concentration of OTA was obtained as shown in FIG. 6 with a lowest limit of detection of 0.18 ng/mL. In the concentration range of 1-250 ng/mL, there is a linear relationship between the relative signal intensity (T/C) and the concentration. A linear regression equation is $y=-0.151x+0.4371$, $R^2=0.9794$, where y is the relative signal Intensity (T/C) and x is a Log function of the concentration of OTA (ng/mL).

Example 4: Detection of Kanamycin Residues in Honey Sample

Honey was used to stimulate a sample to test the recovery rate, the steps were as follows:

(1) Pretreatment of AuNPs@polyA-DNA solution: 0.8-1.4 μL of the prepared and stored AuNPs@polyA-DNA was added onto the gold label pad of the test strip and stored at 4° C.

(2) Pretreatment of sample: A honey sample was diluted for 10 times and filtered with a 0.22 μm microfiltration membrane. Different concentrations of kanamycin (50, 150 and 250 ng/mL) were added to the honey.

(3) Determination of recovery rate of kanamycin in honey: 1 μL of a kanamycin aptamer (0.5 μM) with the nucleotide sequence as shown in SEQ ID NO: 1 in Example 1 was taken to be mixed with 99 μL of honey solutions containing different concentrations of kanamycin in step (2). The mixture was incubated for 20 min. After mixing and reacting, the mixture was detected by using the test strip.

Figure 7:
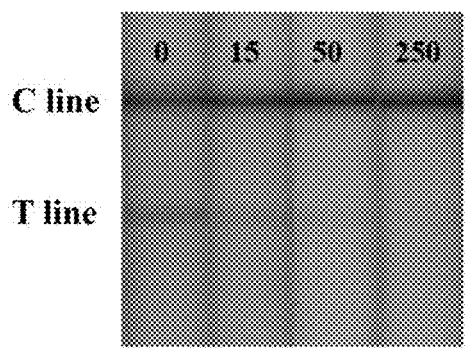
FIG. 7 shows detection graphs of kanamycin at different concentrations in a honey sample using the test strip.
Figure 8A:
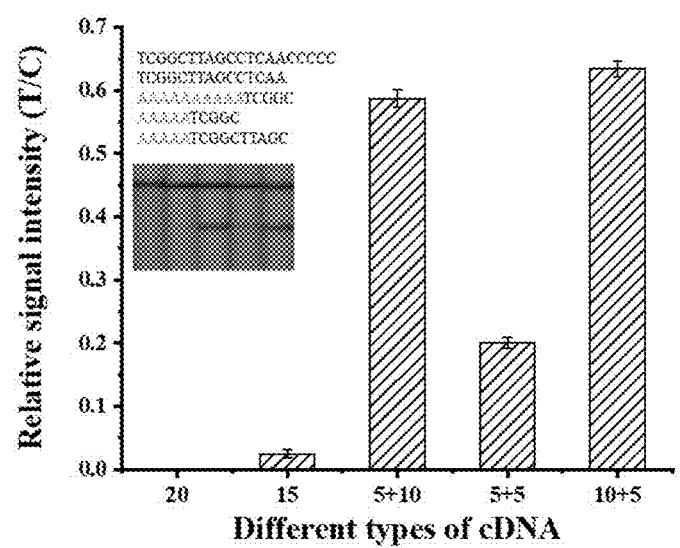
FIG. 8A effect of different aptamer complementary chains on the probe on color development of the T line.
Figure 8B:
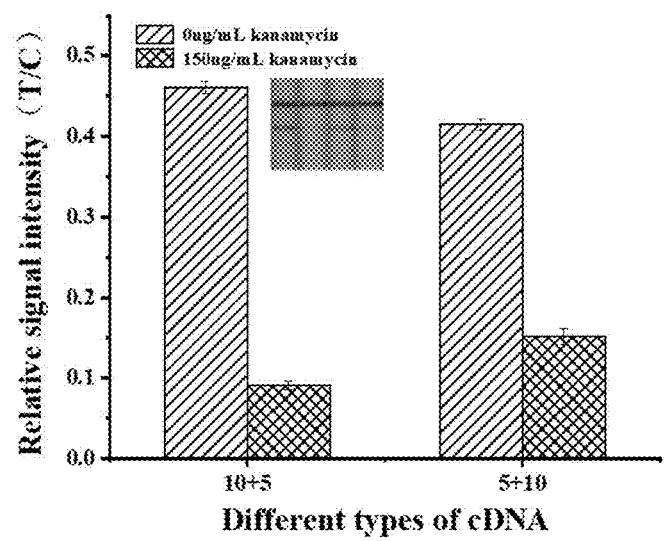
FIG. 8B effect of the probe chain polyA-DNA (5+10) and polyA-DNA(10+5) on the relative signal intensity (T/C) of kanamycin.

The aptamer-based test strip prepared in Example 1 was used to detect the content of kanamycin in honey. Results are shown in Table 4 and FIG. 7.

TABLE 4

Detection of kanamycin residues in honey sample

| Sample | Addition concentration (ng/mL) | Detection concentration (ng/mL) | Spiked recovery rate (%) | RSD (%) |
|---|---|---|---|---|
| Honey | 15 | 14.1 | 94.0 | 8.1 |
|  | 50 | 51.9 | 103.8 | 3.7 |
|  | 250 | 248.6 | 99.4 | 4.4 |

Although the present disclosure has been disclosed as above in the preferred examples, it is not intended to limit the present disclosure. Any person skilled in the art can make various changes and modifications without departing from the spirit and scope of the present disclosure. Therefore, the protection scope of the present disclosure should be as defined in the claims.

What is claimed is:

1. A universal colloidal gold lateral flow test strip comprising:
   an aptamer,
   a probe polyA-DNA, and
   streptavidin-biotin-DNAc;
   wherein:
   the probe poly A-DNA comprises a fragment A, a fragment B, and a fragment C;
   a 5' end of the aptamer is labeled with a biotin;
   the aptamer is configured to specifically bind to small-molecule substances to be tested;
   the fragment A comprises the nucleotide sequence AAAAAAAAAAAAAAATTAT.
   the fragment C comprises the nucleotide sequence of 10 to 15 bases in length that is complementary to an extended 3' end of the aptamer, and
   the small-molecule substances comprise at least one of kanamycin, streptomycin, chloramphenicol, estradiol, bisphenol A, and acetamiprid.

2. The test strip according to claim 1, wherein the extended 3' end of the aptamer comprises 5 to 10 T nucleotides.

3. The test strip according to claim 1, wherein the streptavidin-biotin-DNAc is obtained by:
   mixing streptavidin and a DNAc with a 5' end labeled by biotin in an equal volume, and
   incubating at 3° C. to 5° C. for 0.8 to 1.2 hours;
   where the DNAc comprises the nucleotide sequence as set forth in SEQ ID NO: 5.

4. The test strip according to claim 3, wherein in the mixing step the streptavidin is present at a concentration of 2.5 mg/mL, and the DNAc is present at a concentration of 250 μM.

5. The test strip according to claim 1, wherein the test strip further comprises:
   a sample pad,
   a gold label pad,
   a nitrocellulose membrane,
   an absorbent pad, and
   a polyvinylchloride (PVC) adhesive plate;
   wherein:
   the sample pad, the gold label pad, the nitrocellulose (NC) membrane, and the absorbent pad are pasted on the PVC plate in sequence;
   a test zone and a control zone are arranged on the NC membrane in sequence,
   a distance between the test zone and the control zone is 4 mm to 6 mm;
   the streptavidin is on the test zone and the streptavidin-biotin-DNAc is on the control zone; and
   the gold label pad contains an AuNPs@polyA-DNA conjugate.

6. The test strip according to claim 5, wherein:
   a length of an overlapping portion between the sample pad and the gold label pad is 1 mm to 2 mm, and the sample pad is placed above the gold label pad;
   a length of an overlapping portion between the gold label pad and the NC membrane is 1 mm to 2 mm, and the gold label pad is placed above the NC membrane;
   the a length of an overlapping portion between the NC membrane and the absorbent pad is 1 mm to 3 mm, and the absorbent pad is placed above the NC membrane.

7. The test strip according to claim 5, wherein the AuNPs@polyA-DNA conjugate is obtained by anchoring the probe poly A-DNA on gold nanoparticles (AuNPs).

8. The test strip according to claim 7, wherein:
   a particle size of the gold nanoparticles is 13 mm to 17 nm; and
   a the concentration of the polyA-DNA is 80 μM to 120 μM.

9. A method of preparing the test strip according to claim 5, which comprises:
   (a) cutting the sample pad and the gold label pad,
   (b) soaking the pads with phosphate buffered saline (PBS), and drying the pads;
   (c) spraying the probe AuNPs@polyA-DNA on the gold label pad and drying;
   (d) spraying the streptavidin in the test zone of the NC membrane,
   (e) spraying the streptavidin-biotin-DNAc in the control zone, (f) fixing the distance between the test zone and the control zone at 5 mm, and drying at 35° C. to 39° C. for 2 hours; and (g) pasting the sample pad, the gold label pad, the NC membrane, and the absorbent pad prepared in steps (a) to (f) on the PVC plate in sequence to obtain the colloidal gold lateral flow test strip.

10. The method according to claim 9, wherein;

the AuNPs@polyA-DNA conjugate is prepared by anchoring the probe poly A-DNA onto the gold nanoparticles; and the probe polyA-DNA comprises a polyA fragment, a fragment complementary to the DNAc, and a fragment complementary to the aptamers of the small-molecule substances.

11. The preparation method according to claim 9, wherein:

a particle size of the gold nanoparticles is 13 nm to 17 nm, and a concentration of the polyA-DNA is 80 μM to 120 μM.

* * * * *

SEQUENCE LISTING

```
Sequence total quantity: 13
SEQ ID NO: 1                 moltype = DNA   length = 26
FEATURE                      Location/Qualifiers
source                       1..26
                             mol_type = other DNA
                             organism = synthetic construct
SEQUENCE: 1
tgggggttga ggctaagccg attttt                                           26

SEQ ID NO: 2                 moltype = DNA   length = 51
FEATURE                      Location/Qualifiers
source                       1..51
                             mol_type = other DNA
                             organism = synthetic construct
SEQUENCE: 2
aaaaaaaaaa aaaaattata ttattattat agagtgaaaa atcggcttag c                51

SEQ ID NO: 3                 moltype = DNA   length = 41
FEATURE                      Location/Qualifiers
source                       1..41
                             mol_type = other DNA
                             organism = synthetic construct
SEQUENCE: 3
gatcgggtgt gggtggcgta aagggagcat cggacatttt t                          41

SEQ ID NO: 4                 moltype = DNA   length = 51
FEATURE                      Location/Qualifiers
source                       1..51
                             mol_type = other DNA
                             organism = synthetic construct
SEQUENCE: 4
aaaaaaaaaa aaaaattata ttattattat agagtgaaaa atgtccgatg c                51

SEQ ID NO: 5                 moltype = DNA   length = 22
FEATURE                      Location/Qualifiers
source                       1..22
                             mol_type = other DNA
                             organism = synthetic construct
SEQUENCE: 5
aaaaacactc tataataata at                                               22

SEQ ID NO: 6                 moltype = DNA   length = 21
FEATURE                      Location/Qualifiers
source                       1..21
                             mol_type = other DNA
                             organism = synthetic construct
SEQUENCE: 6
tgggggttga ggctaagccg a                                                21

SEQ ID NO: 7                 moltype = DNA   length = 56
FEATURE                      Location/Qualifiers
source                       1..56
                             mol_type = other DNA
                             organism = synthetic construct
SEQUENCE: 7
aaaaaaaaaa aaaaattata ttattattat agagtgtcgg cttagcctca accccc           56

SEQ ID NO: 8                 moltype = DNA   length = 21
FEATURE                      Location/Qualifiers
source                       1..21
                             mol_type = other DNA
                             organism = synthetic construct
SEQUENCE: 8
tgggggttga ggctaagccg a                                                21

SEQ ID NO: 9                 moltype = DNA   length = 51
FEATURE                      Location/Qualifiers
source                       1..51
                             mol_type = other DNA
                             organism = synthetic construct
SEQUENCE: 9
aaaaaaaaaa aaaaattata ttattattat agagtgtcgg cttagcctca a                51

SEQ ID NO: 10                moltype = DNA   length = 31
FEATURE                      Location/Qualifiers
source                       1..31
                             mol_type = other DNA
                             organism = synthetic construct
```

```
SEQUENCE: 10
tgggggttga ggctaagccg attttttttt t                              31

SEQ ID NO: 11          moltype = DNA  length = 51
FEATURE                Location/Qualifiers
source                 1..51
                       mol_type = other DNA
                       organism = synthetic construct
SEQUENCE: 11
aaaaaaaaaa aaaaattata ttattattat agagtgaaaa aaaaaatcgg c         51

SEQ ID NO: 12          moltype = DNA  length = 26
FEATURE                Location/Qualifiers
source                 1..26
                       mol_type = other DNA
                       organism = synthetic construct
SEQUENCE: 12
tgggggttga ggctaagccg attttt                                    26

SEQ ID NO: 13          moltype = DNA  length = 46
FEATURE                Location/Qualifiers
source                 1..46
                       mol_type = other DNA
                       organism = synthetic construct
SEQUENCE: 13
aaaaaaaaaa aaaaattata ttattattat agagtgaaaa atcggc              46
```